(12) United States Patent
Miliauskas

(10) Patent No.: US 12,602,367 B2
(45) Date of Patent: *Apr. 14, 2026

(54) DATA INTEGRITY CHECKS

(71) Applicant: Palantir Technologies Inc., Denver, CO (US)

(72) Inventor: Gintautas Miliauskas, Palo Alto, CA (US)

(73) Assignee: Palantir Technologies Inc., Aventura, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,094

(22) Filed: Feb. 19, 2024

(65) Prior Publication Data

US 2024/0273084 A1 Aug. 15, 2024

Related U.S. Application Data

(63) Continuation of application No. 17/807,569, filed on Jun. 17, 2022, now Pat. No. 11,940,985, which is a
(Continued)

(51) Int. Cl.
*G06F 16/23* (2019.01)
*G06F 11/32* (2006.01)
(Continued)

(52) U.S. Cl.
CPC ........ *G06F 16/2365* (2019.01); *G06F 11/327* (2013.01); *G06F 16/248* (2019.01); *G06F 16/955* (2019.01); *G06F 21/64* (2013.01)

(58) Field of Classification Search
CPC .. G06F 16/2365; G06F 16/955; G06F 16/248; G06F 11/327; G06F 21/64
See application file for complete search history.

(56) References Cited

U.S. PATENT DOCUMENTS 5,724,575 A 3/1998 Hoover et al.
5,872,973 A 2/1999 Mitchell
(Continued)

FOREIGN PATENT DOCUMENTS

AU 2014206155 12/2015
EP 0652513 A1 5/1995
(Continued)

OTHER PUBLICATIONS

"Apache HBase", Webpage; Apache HBase Overview page, (Sep. 9, 2011), 1.
(Continued)

*Primary Examiner* — Huawen A Peng
(74) *Attorney, Agent, or Firm* — Faegre Drinker Biddle & Reath LLC

(57) ABSTRACT

Aspects of the present disclosure relate to performing agnostic data integrity checks on source data, and based on the data integrity checks, generating a human-readable report that may be useable to identify specific errors or anomalies within the source data. Example embodiments involve systems and methods for performing the data integrity checks and generating the human-readable reports. For example, the method may include operations to ingest data from a source database through a data pipeline and into a local database, access the data from the data pipeline, determine a data type of the data, determine subtypes of data elements which make up the data, determine a count of each subtype, and generate a human-readable report, to be displayed at a client device.

20 Claims, 8 Drawing Sheets

Related U.S. Application Data continuation of application No. 16/242,393, filed on Jan. 8, 2019, now Pat. No. 11,397,723, which is a continuation of application No. 15/659,152, filed on Jul. 25, 2017, now Pat. No. 10,229,153, which is a continuation of application No. 15/227,854, filed on Aug. 3, 2016, now Pat. No. 9,836,499, which is a continuation of application No. 14/849,454, filed on Sep. 9, 2015, now Pat. No. 9,454,564.

(51) Int. Cl.

| | |
|---|---|
| *G06F 16/248* | (2019.01) |
| *G06F 16/955* | (2019.01) |
| *G06F 21/64* | (2013.01) |

(56) References Cited

U.S. PATENT DOCUMENTS

| | | | |
|---|---|---|---|
| 5,897,636 A | 4/1999 | Kaeser | |
| 6,073,129 A | 6/2000 | Levine et al. | |
| 6,094,653 A | 7/2000 | Li et al. | |
| 6,161,098 A | 12/2000 | Wallman | |
| 6,243,717 B1 | 6/2001 | Gordon et al. | |
| 6,304,873 B1 | 10/2001 | Klein et al. | |
| 6,366,933 B1 | 4/2002 | Ball et al. | |
| 6,418,438 B1 | 7/2002 | Campbell | |
| 6,510,504 B2 | 1/2003 | Satyanarayanan | |
| 6,549,752 B2 | 4/2003 | Tsukamoto | |
| 6,560,620 B1 | 5/2003 | Ching | |
| 6,574,635 B2 | 6/2003 | Stauber et al. | |
| 6,745,382 B1 | 6/2004 | Zothner | |
| 6,976,210 B1 | 12/2005 | Silva et al. | |
| 6,980,984 B1 | 12/2005 | Huffman et al. | |
| 7,013,395 B1 | 3/2006 | Swiler et al. | |
| 7,058,648 B1 | 6/2006 | Lightfoot et al. | |
| 7,111,231 B1 | 9/2006 | Huck et al. | |
| 7,194,680 B1 | 3/2007 | Roy et al. | |
| 7,287,689 B2 | 10/2007 | Tidwell et al. | |
| 7,376,672 B2 | 5/2008 | Weare | |
| 7,461,158 B2 | 12/2008 | Rider et al. | |
| 7,472,421 B2 | 12/2008 | Cummins | |
| 7,725,530 B2 | 5/2010 | Sah et al. | |
| 7,725,728 B2 | 5/2010 | Ama et al. | |
| 7,730,082 B2 | 6/2010 | Sah et al. | |
| 7,730,109 B2 | 6/2010 | Rohrs et al. | |
| 7,761,407 B1 | 7/2010 | Stern | |
| 7,814,084 B2 | 10/2010 | Hallett et al. | |
| 7,962,495 B2 | 6/2011 | Jain et al. | |
| 7,984,374 B2 | 7/2011 | Caro et al. | |
| 8,041,714 B2 | 10/2011 | Aymeloglu et al. | |
| 8,112,425 B2 | 2/2012 | Baum et al. | |
| 8,126,848 B2 | 2/2012 | Wagner | |
| 8,140,337 B2 | 3/2012 | Nakazawa et al. | |
| 8,181,253 B1 | 5/2012 | Zaitsev et al. | |
| 8,185,819 B2 | 5/2012 | Sah et al. | |
| 8,295,898 B2 | 10/2012 | Ashfield et al. | |
| 8,434,150 B2 | 4/2013 | Xie et al. | |
| 8,448,247 B2 | 5/2013 | Stute | |
| 8,504,542 B2 | 8/2013 | Chang et al. | |
| 8,533,319 B2 | 9/2013 | Draugelis | |
| 8,615,605 B2 | 12/2013 | Yu et al. | |
| 8,676,857 B1 | 3/2014 | Adams et al. | |
| 8,751,478 B1 * | 6/2014 | Ramajayam | G06Q 30/02 707/708 |
| 8,769,412 B2 | 7/2014 | Gill et al. | |
| 8,782,470 B2 * | 7/2014 | Neumueller | G06F 11/3684 714/25 |
| 8,789,140 B2 | 7/2014 | Williams et al. | |
| 8,881,288 B1 | 11/2014 | Levy et al. | |
| 8,904,506 B1 | 12/2014 | Canavor et al. | |
| 8,930,331 B2 | 1/2015 | McGrew et al. | |
| 8,931,043 B2 | 1/2015 | Cooper et al. | |
| 8,954,410 B2 | 2/2015 | Chang et al. | |
| 9,009,827 B1 | 4/2015 | Albertson et al. | |
| 9,043,696 B1 | 5/2015 | Meiklejohn et al. | |
| 9,092,482 B2 | 7/2015 | Harris et al. | |
| 9,116,975 B2 | 8/2015 | Shankar et al. | |
| 9,208,159 B2 | 12/2015 | Stowe et al. | |
| 9,230,280 B1 | 1/2016 | Maag et al. | |
| 9,280,532 B2 | 3/2016 | Cicerone et al. | |
| 9,319,419 B2 | 4/2016 | Sprague et al. | |
| 9,396,085 B2 * | 7/2016 | Hoffmeister | G06F 11/3072 |
| 9,396,287 B1 * | 7/2016 | Bhave | G06F 16/334 |
| 9,401,925 B1 | 7/2016 | Guo et al. | |
| 9,407,652 B1 | 8/2016 | Kesin et al. | |
| 9,419,992 B2 | 8/2016 | Ricafort et al. | |
| 9,537,880 B1 | 1/2017 | Jones et al. | |
| 9,576,119 B2 | 2/2017 | Mcgeehan et al. | |
| 9,628,500 B1 | 4/2017 | Kesin et al. | |
| 9,836,499 B1 | 12/2017 | Miliauskas et al. | |
| 9,930,055 B2 | 3/2018 | Ricafort et al. | |
| 10,044,745 B1 | 8/2018 | Jones et al. | |
| 10,075,464 B2 | 9/2018 | Kesin et al. | |
| 10,129,282 B2 | 11/2018 | Jones et al. | |
| 10,467,550 B1 * | 11/2019 | Gupta | G06N 20/00 |
| 2001/0051949 A1 | 12/2001 | Carey et al. | |
| 2001/0056522 A1 | 12/2001 | Satyanarayana | |
| 2002/0091694 A1 | 7/2002 | Hrle et al. | |
| 2003/0105759 A1 | 6/2003 | Bess et al. | |
| 2003/0115481 A1 | 6/2003 | Baird et al. | |
| 2003/0120675 A1 | 6/2003 | Stauber et al. | |
| 2003/0130993 A1 | 7/2003 | Mendelevitch et al. | |
| 2003/0212718 A1 | 11/2003 | Tester | |
| 2004/0111410 A1 | 6/2004 | Burgoon et al. | |
| 2004/0117345 A1 | 6/2004 | Bamford et al. | |
| 2004/0117387 A1 | 6/2004 | Civetta et al. | |
| 2004/0148301 A1 | 7/2004 | McKay et al. | |
| 2005/0097441 A1 | 5/2005 | Herbach et al. | |
| 2005/0108231 A1 | 5/2005 | Findleton et al. | |
| 2005/0114763 A1 | 5/2005 | Nonomura et al. | |
| 2005/0125295 A1 | 6/2005 | Tidwell et al. | |
| 2005/0157662 A1 | 7/2005 | Bingham et al. | |
| 2005/0289524 A1 | 12/2005 | McGinnes | |
| 2006/0021049 A1 | 1/2006 | Cook | |
| 2006/0074881 A1 | 4/2006 | Vembu et al. | |
| 2006/0080316 A1 | 4/2006 | Gilmore et al. | |
| 2006/0095521 A1 | 5/2006 | Patinkin | |
| 2006/0106847 A1 | 5/2006 | Eckardt et al. | |
| 2006/0116991 A1 | 6/2006 | Calderwood | |
| 2006/0156407 A1 | 7/2006 | Cummins | |
| 2006/0161558 A1 | 7/2006 | Tamma et al. | |
| 2006/0218206 A1 | 9/2006 | Bourbonnais et al. | |
| 2006/0218405 A1 | 9/2006 | Ama et al. | |
| 2006/0218491 A1 | 9/2006 | Grossman et al. | |
| 2006/0242630 A1 | 10/2006 | Koike et al. | |
| 2006/0253502 A1 | 11/2006 | Raman et al. | |
| 2006/0265324 A1 | 11/2006 | Leclerc et al. | |
| 2006/0265397 A1 | 11/2006 | Bryan et al. | |
| 2006/0265751 A1 | 11/2006 | Cosquer et al. | |
| 2007/0050429 A1 | 3/2007 | Goldring et al. | |
| 2007/0061487 A1 | 3/2007 | Moore et al. | |
| 2007/0067846 A1 | 3/2007 | Mcfarlane et al. | |
| 2007/0143253 A1 | 6/2007 | Kostamaa et al. | |
| 2007/0185850 A1 | 8/2007 | Walters et al. | |
| 2007/0233756 A1 | 10/2007 | D'Souza et al. | |
| 2007/0271317 A1 | 11/2007 | Carmel | |
| 2007/0288175 A1 | 12/2007 | Tobita et al. | |
| 2008/0005555 A1 | 1/2008 | Lotem et al. | |
| 2008/0015970 A1 | 1/2008 | Brookfield et al. | |
| 2008/0082380 A1 | 4/2008 | Stephenson | |
| 2008/0104060 A1 | 5/2008 | Abhyankar et al. | |
| 2008/0104149 A1 | 5/2008 | Vishniac et al. | |
| 2008/0195672 A1 | 8/2008 | Hamel et al. | |
| 2008/0201339 A1 | 8/2008 | McGrew | |
| 2008/0215546 A1 | 9/2008 | Baum et al. | |
| 2008/0222706 A1 | 9/2008 | Renaud et al. | |
| 2008/0270316 A1 | 10/2008 | Guidotti et al. | |
| 2008/0301378 A1 | 12/2008 | Carrie | |
| 2009/0031247 A1 | 1/2009 | Walter et al. | |
| 2009/0106308 A1 | 4/2009 | Killian et al. | |
| 2009/0164387 A1 | 6/2009 | Armstrong et al. | |
| 2009/0177962 A1 | 7/2009 | Gusmorino et al. | |
| 2009/0254971 A1 | 10/2009 | Herz et al. | |

(56) References Cited

U.S. PATENT DOCUMENTS

| | | | |
|---|---|---|---|
| 2009/0271435 A1 | 10/2009 | Yako et al. | |
| 2009/0292743 A1 | 11/2009 | Bigus et al. | |
| 2009/0313223 A1 | 12/2009 | Rantanen et al. | |
| 2009/0313311 A1 | 12/2009 | Hoffmann et al. | |
| 2009/0319832 A1 | 12/2009 | Zhang et al. | |
| 2010/0024017 A1 | 1/2010 | Ashfield et al. | |
| 2010/0036831 A1 | 2/2010 | Vemuri et al. | |
| 2010/0070489 A1 | 3/2010 | Aymeloglu et al. | |
| 2010/0076939 A1 | 3/2010 | Iwaki et al. | |
| 2010/0082541 A1 | 4/2010 | Kottomtharayil | |
| 2010/0094902 A1* | 4/2010 | Vyvyan | G06F 16/27 |
| | | | 713/168 |
| 2010/0114817 A1 | 5/2010 | Broeder et al. | |
| 2010/0114831 A1 | 5/2010 | Gilbert et al. | |
| 2010/0114887 A1 | 5/2010 | Conway et al. | |
| 2010/0138842 A1 | 6/2010 | Balko et al. | |
| 2010/0145909 A1 | 6/2010 | Ngo | |
| 2010/0161565 A1 | 6/2010 | Lee et al. | |
| 2010/0161688 A1 | 6/2010 | Kesselman et al. | |
| 2010/0191884 A1 | 7/2010 | Holenstein et al. | |
| 2010/0211550 A1 | 8/2010 | Daniello et al. | |
| 2010/0211618 A1 | 8/2010 | Anderson et al. | |
| 2010/0235606 A1 | 9/2010 | Oreland et al. | |
| 2010/0283787 A1 | 11/2010 | Hamedi et al. | |
| 2010/0325581 A1 | 12/2010 | Finkelstein et al. | |
| 2011/0029498 A1 | 2/2011 | Ferguson et al. | |
| 2011/0047540 A1 | 2/2011 | Williams et al. | |
| 2011/0153592 A1 | 6/2011 | DeMarcken | |
| 2011/0173619 A1 | 7/2011 | Fish | |
| 2011/0184813 A1 | 7/2011 | Barnes et al. | |
| 2011/0258158 A1 | 10/2011 | Resende, Jr. et al. | |
| 2011/0258242 A1 | 10/2011 | Eidson et al. | |
| 2011/0270812 A1 | 11/2011 | Ruby et al. | |
| 2011/0295982 A1 | 12/2011 | Misra | |
| 2011/0296003 A1 | 12/2011 | Mccann et al. | |
| 2012/0072825 A1 | 3/2012 | Sherkin et al. | |
| 2012/0102002 A1* | 4/2012 | Sathyanarayana | G06F 16/215 |
| | | | 707/687 |
| 2012/0123989 A1 | 5/2012 | Yu et al. | |
| 2012/0124179 A1 | 5/2012 | Cappio et al. | |
| 2012/0136804 A1 | 5/2012 | Lucia et al. | |
| 2012/0150791 A1 | 6/2012 | Willson | |
| 2012/0173710 A1 | 7/2012 | Rodriguez | |
| 2012/0185419 A1 | 7/2012 | Kuhn et al. | |
| 2012/0198489 A1 | 8/2012 | Oconnell et al. | |
| 2012/0284791 A1 | 11/2012 | Miller et al. | |
| 2012/0330908 A1 | 12/2012 | Stowe et al. | |
| 2013/0036346 A1 | 2/2013 | Cicerone | |
| 2013/0060742 A1 | 3/2013 | Chang et al. | |
| 2013/0097130 A1 | 4/2013 | Bingol et al. | |
| 2013/0097709 A1 | 4/2013 | Basavapatna et al. | |
| 2013/0145214 A1 | 6/2013 | Provencher | |
| 2013/0151388 A1 | 6/2013 | Falkenborg et al. | |
| 2013/0239217 A1 | 9/2013 | Kindler et al. | |
| 2013/0254833 A1 | 9/2013 | Nicodemus et al. | |
| 2013/0254885 A1 | 9/2013 | Devost | |
| 2013/0275416 A1 | 10/2013 | Thomson et al. | |
| 2013/0304770 A1 | 11/2013 | Boero et al. | |
| 2013/0318060 A1 | 11/2013 | Chang et al. | |
| 2013/0331992 A1 | 12/2013 | Subramaniam et al. | |
| 2014/0053265 A1 | 2/2014 | Crowley | |
| 2014/0082691 A1 | 3/2014 | Warn et al. | |
| 2014/0122930 A1* | 5/2014 | Devale | G06F 11/2268 |
| | | | 714/37 |
| 2014/0149272 A1 | 5/2014 | Hirani et al. | |
| 2014/0173738 A1 | 6/2014 | Condry et al. | |
| 2014/0181833 A1 | 6/2014 | Bird et al. | |
| 2014/0181968 A1 | 6/2014 | Ge et al. | |
| 2014/0201345 A1 | 7/2014 | Abuelsaad et al. | |
| 2014/0279684 A1 | 9/2014 | Liao et al. | |
| 2014/0324876 A1 | 10/2014 | Konik et al. | |
| 2014/0344231 A1 | 11/2014 | Stowe et al. | |
| 2015/0019303 A1 | 1/2015 | Rao | |
| 2015/0039886 A1 | 2/2015 | Kahol et al. | |
| 2015/0047026 A1 | 2/2015 | Neil et al. | |
| 2015/0066987 A1 | 3/2015 | Nelke | |
| 2015/0089353 A1 | 3/2015 | Folkening | |
| 2015/0089568 A1 | 3/2015 | Sprague et al. | |
| 2015/0106347 A1 | 4/2015 | McGrew et al. | |
| 2015/0112956 A1 | 4/2015 | Chang et al. | |
| 2015/0212663 A1 | 7/2015 | Papale et al. | |
| 2015/0213043 A1 | 7/2015 | Ishil et al. | |
| 2015/0213134 A1 | 7/2015 | Nie et al. | |
| 2015/0227295 A1 | 8/2015 | Meiklejohn et al. | |
| 2015/0229664 A1 | 8/2015 | Hawthor et al. | |
| 2015/0235152 A1 | 8/2015 | Eldardiry et al. | |
| 2015/0242397 A1 | 8/2015 | Zhuang | |
| 2015/0261817 A1 | 9/2015 | Harris et al. | |
| 2015/0326601 A1 | 11/2015 | Grondin et al. | |
| 2015/0341467 A1 | 11/2015 | Lim et al. | |
| 2016/0034545 A1 | 2/2016 | Shankar et al. | |
| 2016/0062555 A1 | 3/2016 | Ward et al. | |
| 2016/0162986 A1 | 6/2016 | Ghosh | |
| 2016/0179905 A1* | 6/2016 | Gibbons | G06F 16/25 |
| | | | 707/737 |
| 2016/0191532 A1 | 6/2016 | Seiver et al. | |
| 2017/0032015 A1 | 2/2017 | Shkapenyuk | |
| 2017/0099311 A1 | 4/2017 | Kesin et al. | |
| 2017/0111381 A1 | 4/2017 | Jones et al. | |
| 2017/0195354 A1 | 7/2017 | Kesin et al. | |
| 2017/0235725 A1* | 8/2017 | Ghosh | G06F 16/23 |
| | | | 718/103 |
| 2018/0159874 A1 | 6/2018 | Ricafort et al. | |
| 2018/0351991 A1 | 12/2018 | Jones et al. | |
| 2019/0007441 A1 | 1/2019 | Kesin et al. | |
| 2019/0081971 A1 | 3/2019 | Jones et al. | |

FOREIGN PATENT DOCUMENTS

| | | |
|---|---|---|
| EP | 1589716 A1 | 10/2005 |
| EP | 2555126 A2 | 2/2013 |
| EP | 2863326 A1 | 4/2015 |
| EP | 2891992 A1 | 7/2015 |
| EP | 2985974 A1 | 2/2016 |
| EP | 2993595 A1 | 3/2016 |
| EP | 3110104 A1 | 12/2016 |
| EP | 3133522 A1 | 2/2017 |
| WO | WO-2012025915 A1 | 3/2012 |

OTHER PUBLICATIONS

"U.S. Appl. No. 13/196,788, Examiner Interview Summary mailed Nov. 25, 2015", 7 pgs.

"U.S. Appl. No. 13/196,788, Non Final Office Action mailed Oct. 23, 2015", 20 pgs.

"U.S. Appl. No. 13/196,788, Notice of Allowance mailed Dec. 18, 2015", 17 pgs.

"U.S. Appl. No. 13/826,228, Notice of Allowance mailed Mar. 27, 2015", 10 pgs.

"U.S. Appl. No. 14/278,963, Final Office Action mailed Jan. 30, 2015", 6 pgs.

"U.S. Appl. No. 14/278,963, Notice of Allowance mailed Sep. 2, 2015", 6 pgs.

"U.S. Appl. No. 14/451,221, Ex Parte Quayle Action mailed Apr. 6, 2015", 4 pgs.

"U.S. Appl. No. 14/451,221, Notice of Allowance mailed Aug. 4, 2015", 15 pgs.

"U.S. Appl. No. 14/504,103, First Action Interview Pre-Interview Communication mailed Feb. 5, 2015", 22 pgs.

"U.S. Appl. No. 14/504,103, First Action Interview Pre-Interview Communication mailed Mar. 31, 2015", 9 pgs.

"U.S. Appl. No. 14/504,103, Notice of Allowance mailed May 18, 2015", 18 pgs.

"U.S. Appl. No. 14/578,389, Non Final Office Action mailed Oct. 21, 2015", 17 pgs.

"U.S. Appl. No. 14/580,218, Non Final Office Action mailed Jun. 26, 2015", 22 pgs.

"U.S. Appl. No. 14/726,211, Non Final Office Action mailed mailed Apr. 5, 2016", 15 pgs.

(56) References Cited

OTHER PUBLICATIONS

"U.S. Appl. No. 14/734,772, First Action Interview Pre-Interview Communication Jul. 24, 2015", 12 pgs.
"U.S. Appl. No. 14/734,772, First Action Interview Pre-Interview Communication mailed Oct. 30, 2015", 14 pgs.
"U.S. Appl. No. 14/746,671, First Action Interview Pre-Interview Communication malled Sep. 28, 2015", 5 pgs.
"U.S. Appl. No. 14/746,671, First Action Interview Pre-Interview Communication mailed Nov. 12, 2015", 19 pgs.
"U.S. Appl. No. 14/746,671, Notice of Allowance mailed Jan. 21, 2016", 7 pgs.
"U.S. Appl. No. 14/841,338, Non Final Office Action mailed Feb. 18, 2016", 39 pgs.
"U.S. Appl. No. 14/849,454, Notice of Allowance mailed May 25, 2016", 17 pgs.
"U.S. Appl. No. 15/227,854, Non Final Office Action mailed Mar. 3, 2017", 15 pgs.
"U.S. Appl. No. 15/227,854, Notice of Allowance mailed Jun. 30, 2017", 8 pgs.
"BackTult—JD Edwards One World Version Control System", eKin Systems, Inc., 1.
"European Application Serial No. 14189344.6, Extended European Search Report mailed Feb. 20, 2015", 8 pgs.
"European Application Serial No. 14199182.8, Extended European Search Report mailed Mar. 13, 2015", 8 pgs.
"European Application Serial No. 15183721.8, Extended European Search Report mailed Nov. 23, 2015", 8 pgs.
"Federated Database System", From Wikipedia, (Sep. 7, 2013), 1-6.
"Netherlands Application Serial No. 2012436, Search Report mailed Nov. 6, 2015", w/ English Translation, 8 pgs.
"The Apache Cassandra Project", [Online] Retrieved from the Internet: <http://cassandra.apache.org/> (Jun. 4, 2015), 3 pgs.
"Toad for Oracle 11.6, Guide to Using Toad", Quest Software, (2012), 1-162.
Antoshenkov, Gennady, "Dictionary-based order-preserving string compression", The VLDB Journal, #6, (1997), 1-14.
Baker, Jason, et al., "Megastore: Providing Scalable, Highly Available Storage for Interactive Services", 5th Biennial Conference on Innovative Data Systems Research (CIDR '11) Jan. 9-12, 2011, Asilomar, California, USA., (Jan. 2011), 223-234.
Bernstein, Philip, et al., "Hyder—A Transactional Record Manager for Shared Flash", 5th Biennial Conference on Innovative Data Systems Research (CIDR '11) Jan. 9-12, 2011, Asilomar, California, USA, (Jan. 2011), 9-20.
Chang, Fay, et al., "Bigtable: A Distributed Storage System for Structured Data", Google, Inc. OSDI'06: Seventh Symposium on Operating System Design and Implementation, Seattle, WA, (Jun. 2, 2008), 1-14.
Chung, Chin-Wan, "Dataplex: An Access to Heterogeneous Distributed Databases", Communications of the ACM, Association for Computing Machinery, Inc., vol. 33, No. 1, (Jan. 1, 1990), 70-80.
Devanbu, Prem, et al., "Authentic Third-party Data Publication", [Online] Retrieved from the internet: <http://www.cs.ucdavis.edu/~devanbu/authdbpub.pdf> (2000), 19 pgs.
Dreyer, Werner, et al., "An Object-Oriented Data Model for a Time Series Management System", IEEE—Proceedings of the 7th International Working Conference on Scientific and Statistical Datibise Management, Charlottesville, Virginia USA,, (1994), 12 pgs.
Elmasri, Ramez, et al., "Fundamentals of Database Systems", Fourth Edition—Chapter 14—Indexing Structures for Files, (2004), 455-491.
Hogue, Andrew, et al., "Thresher: Automating the Unwrapping of Semantic Content from the World Wide Web", 14th International Conference on World Wide Web, WWW 2005, (May 2005), 86-95.
Klemmer, Scott R, et al., "Where Do Web Sites Come From? Capturing and Interacting with Design History", Association for Computing Machinery, CHI 2002, (Apr. 2002), 1-8.
Kokossis, A, et al., "D7-Dynamic Ontology Managment system (Design)", h-TechSight Consortium Oct. 2002, (Oct. 2002), 27 pgs.

Mentzas, G., et al., "An Architecture for Intelligent Assistance in the Forecasting Process", Proceedings of the 28th Annual Hawaii International Conference on System Sciences, (1995), 167-176.
Miklau, Gerome, et al., "Securing history: Privacy and accountability in database systems", 3rd Biennial Conference on Innovative Data Systems Research (CIDR), (2007), 387-396.
Niepert, M., et al., "A Dynamic Ontology for a Dynamic Reference Work", JCDL '07 Proceedings, ACM, (Jun. 2007), 10.
Nierman, Andrew, et al., "Evaluating Structural Similarity in XML Documents", U of Michigan, (2002), 1-6.
Peng, Daniel, et al., "Large-scale Incremental Processing Using Distribuited Transactions and Notifications", OSDI, (2010), 1-15.
Thomson, Alexander, et al., "The Case for Determinism in Database Systems", Proceedings of the VLDB Endowment, 3(1), (Sep. 2010), 70-80.
Wollrath, Ann, et al., "A Distributed Object Model for the Java System", Proceedings of the 2nd Conference on USENEX, Conference on Object-Orients Technologies and Systems, (Jun. 1996), 219-231.
Yang, Yudong, "HTML Page Analysis Based on Visual Cues", 2001 IEEE, (2001), 859-864 "U.S. Appl. No. 15/462,540, Non-Final Office Action mailed Oct. 13, 2017", 16 pg s.
"U.S. Appl. No. 14/823,935, Notice of Allowance mailed Apr. 25, 2016", 5 pgs.
"U.S. Appl. No. 14/970,317, First Action Interview Pre-Interview Communication mailed Mar. 21, 2016", 9 pgs.
"U.S. Appl. No. 14/970,317, Notice of Allowance mailed May 26, 2016", 6 pgs.
"U.S. Appl. No. 14/982,699, First Action Interview Pre-Interview Communication mailed Mar. 25, 2016", 9 pgs.
"U.S. Appl. No. 14/982,699, Notice of Allowance mailed Oct. 7, 2016", 12 pgs.
"U.S. Appl. No. 15/207,343, Final Office Action mailed May 17, 2017", 27 pgs.
"U.S. Appl. No. 15/207,343, First Action Interview Pre-Interview Communication mailed Nov. 23, 2016", 7 pgs.
"U.S. Appl. No. 15/207,343, Non-Final Office Action mailed Sep. 27, 2017", 24 pgs.
"U.S. Appl. No. 15/207,343, Notice of Allowance malled Apr. 3, 2018", 30 pgs.
"U.S. Appl. No. 15/224,443, Notice of Allowance mailed Dec. 19, 2016", 9 pgs.
"U.S. Appl. No. 15/228,297, First Action Interview Pre-Interview Communication mailed Jun. 30, 2017", 5 pgs.
"U.S. Appl. No. 15/228,297, Notice of Allowance mailed Nov. 24, 2017", 5 pgs.
"U.S. Appl. No. 15/395,483, Final Office Action mailed Mar. 28, 2018", 12 pgs.
"U.S. Appl. No. 15/395,483, First Action Interview Office Action Summary mailed Sep. 21, 2017", 7 pgs.
"U.S. Appl. No. 15/395,483, First Action Interview Pre-Interview Communication mailed Jul. 6, 2017", 5 pgs.
"U.S. Appl. No. 15/462,540, First Action Interview Pre-Interview Communication mailed Jul. 5, 2017", 5 pgs.
"U.S. Appl. No. 15/462,540, Notice of Allowance mailed May 10, 2018", 17 pgs.
"U.S. Appl. No. 15/659,152, Non-Final Office Action mailed Apr. 4, 2018", 18 pgs.
"U.S. Appl. No. 15/891,873, First Action Interview Pre-Interview Communication mailed Oct. 29, 2018", 4 pgs.
"U.S. Appl. No. 16/109,379, First Action Interview Pre-Interview Communication mailed Nov. 2, 2018", 4 pgs.
"European Application Serial No. 15180985.2, Communication pursuant to Article 94(3) mailed Mar. 30, 2017", 4 pgs.
"European Application Serial No. 16176273.7, Extended European Search Report mailed Oct. 21, 2016", 6 pgs.
"European Application Serial No. 16184823.9, Communication pursuant to Article 94(3) mailed May 23, 2018", 6 pgs.
"European Application Serial No. 16184823.9, Extended European Search Report mailed Oct. 21, 2016", 7 pgs.
"European Application Serial No. 18161005.6, Extended European Search Report mailed Apr. 11, 2018", 7 pgs.

(56)        References Cited

OTHER PUBLICATIONS

Bhuyan, Monowar H., et al., "Network Anomaly Detection: Methods, Systems and Tools", IEEE Coivimunications Surveys & Tutorials, vol. 16. No. 1, (2014), 303-336 Notice of Allowance for U.S. Appl. No. 14/734,772 dated Dec. 16, 2014 Official Communication for U.S. Appl. No. 14/734,772 dated Apr. 22, 2016. Official Communication for U.S. Appl. No. 14/734,772 dated May 20, 2016. Notice of Allowance for U.S. Appl. No. 14/734,772 dated Apr. 27, 2016.

* cited by examiner

Figure 2:
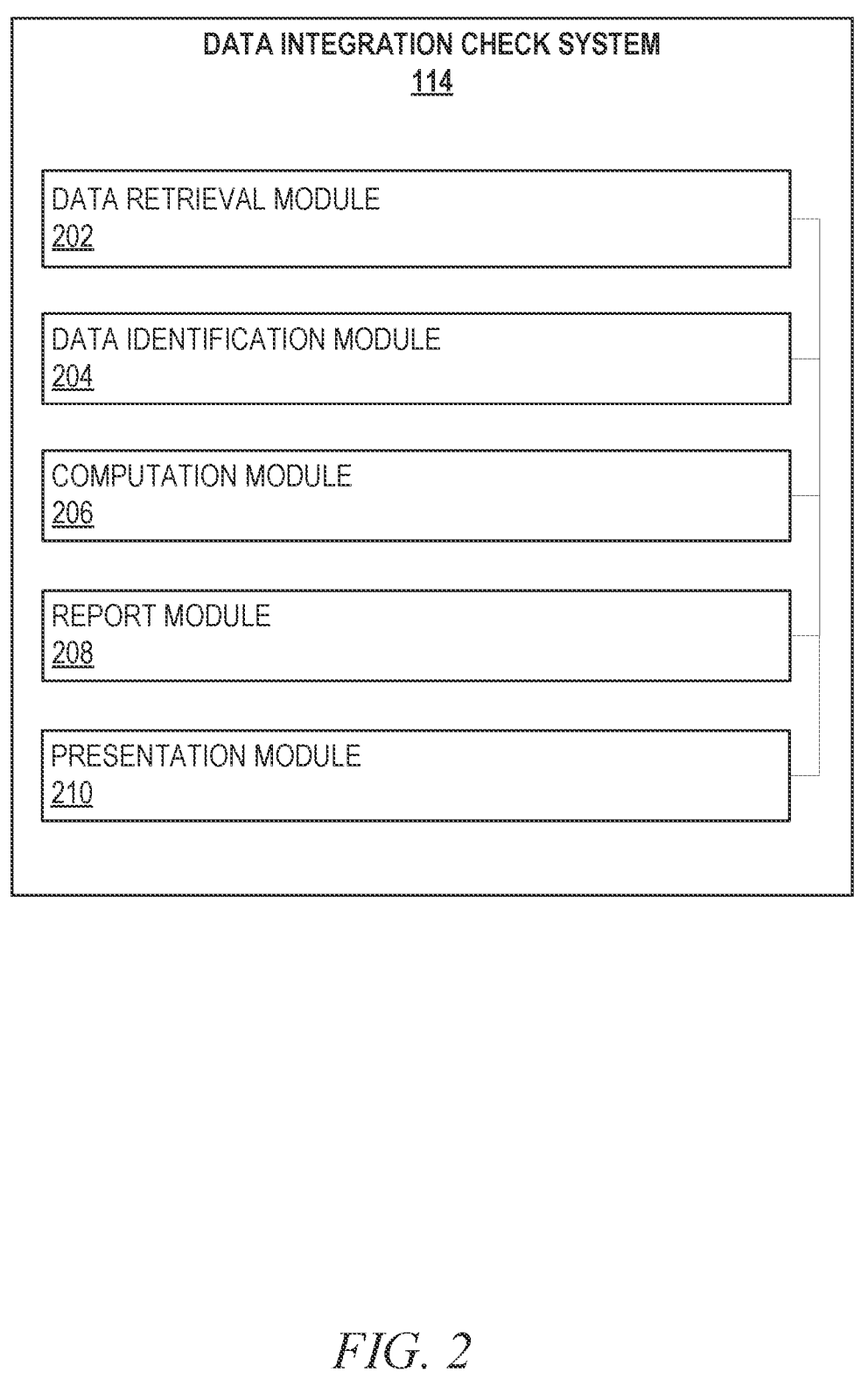

DATA INTEGRATION CHECK SYSTEM
114

DATA RETRIEVAL MODULE
202

DATA IDENTIFICATION MODULE
204

COMPUTATION MODULE
206

REPORT MODULE
208

PRESENTATION MODULE
210

402 — INGEST DATA FROM A SOURCE DATABASE

404 — DETERMINE A DATA TYPE OF THE DATA

406 — DETERMINE SUBTYPES OF EACH ELEMENT WITHIN THE DATA

408 — DETERMINE A COUNT OF EACH SUBTYPE

410 — GENERATE A HUMAN-READABLE REPORT

412 — CAUSE DISPLAY OF THE HUMAN-READABLE REPORT

500

502 — ACCESS HISTORICAL DATA BASED ON THE SOURCE OF THE DATA

504 — DETERMINE A DATA TYPE OF THE HISTORICAL DATA

506 — DETERMINE SUBTYPES OF THE HISTORICAL DATA

508 — DETERMINE A COUNT OF THE SUBTYPES OF THE HISTORICAL DATA

510 — GENERATE A HUMAN-READABLE REPORT CORRESPONDING TO THE HISTORICAL DATA

DATA INTEGRITY CHECKS

CROSS-REFERENCE TO RELATED APPLICATIONS

This application is a continuation of U.S. patent application Ser. No. 17/807,569, filed Jun. 17, 2022, which is a continuation of U.S. patent application Ser. No. 16/242,393, filed Jan. 8, 2019, which is a continuation of U.S. patent application Ser. No. 15/659,152, filed Jul. 25, 2017, which is a continuation of U.S. patent application Ser. No. 15/227, 854, filed Aug. 3, 2016, which is a continuation of U.S. patent application Ser. No. 14/849,454, filed Sep. 9, 2015, the disclosures of which are incorporated herein in their entireties by reference.

TECHNICAL FIELD

The subject matter disclosed herein relates to data processing. In particular, example embodiments may relate to techniques for detecting inconsistencies and errors in source data.

BACKGROUND

As computing power and data storage grows, computational tools configured to ingest large amounts of source data through data pipelines have become increasingly common. This source data may include, for example, tabular input data, comprising multiple rows and columns of data elements.

Unfortunately, as source data is frequently retrieved from multiple sources, the data is often disorganized and may suffer from data quality issues as a result of formatting errors and human error. As a result, the computational tools are often unable to perform their intended functions effectively. Thus, methods exist to analyze and detect anomalies which may exist in the source data, with varying levels of usefulness.

For example, automated systems exist which monitor streams of source data and are configured to detect specific types of errors and inconsistencies within the data. However, these methods are not entirely effective, and are not capable of detecting incorrect values that may be correctly formatted. An alternative solution is to create custom tools for monitoring specific data streams. While these methods may prove effective, the process of creating and testing the tool itself often proves to be difficult and time consuming.

BRIEF DESCRIPTION OF THE DRAWINGS

Various ones of the appended drawings merely illustrate example embodiments of the present inventive subject matter and cannot be considered as limiting its scope.

FIG. 2 is a block diagram illustrating various modules comprising a data integrity check system, which is provided as part of the data processing platform, consistent with some embodiments.

DETAILED DESCRIPTION

Figure 1:
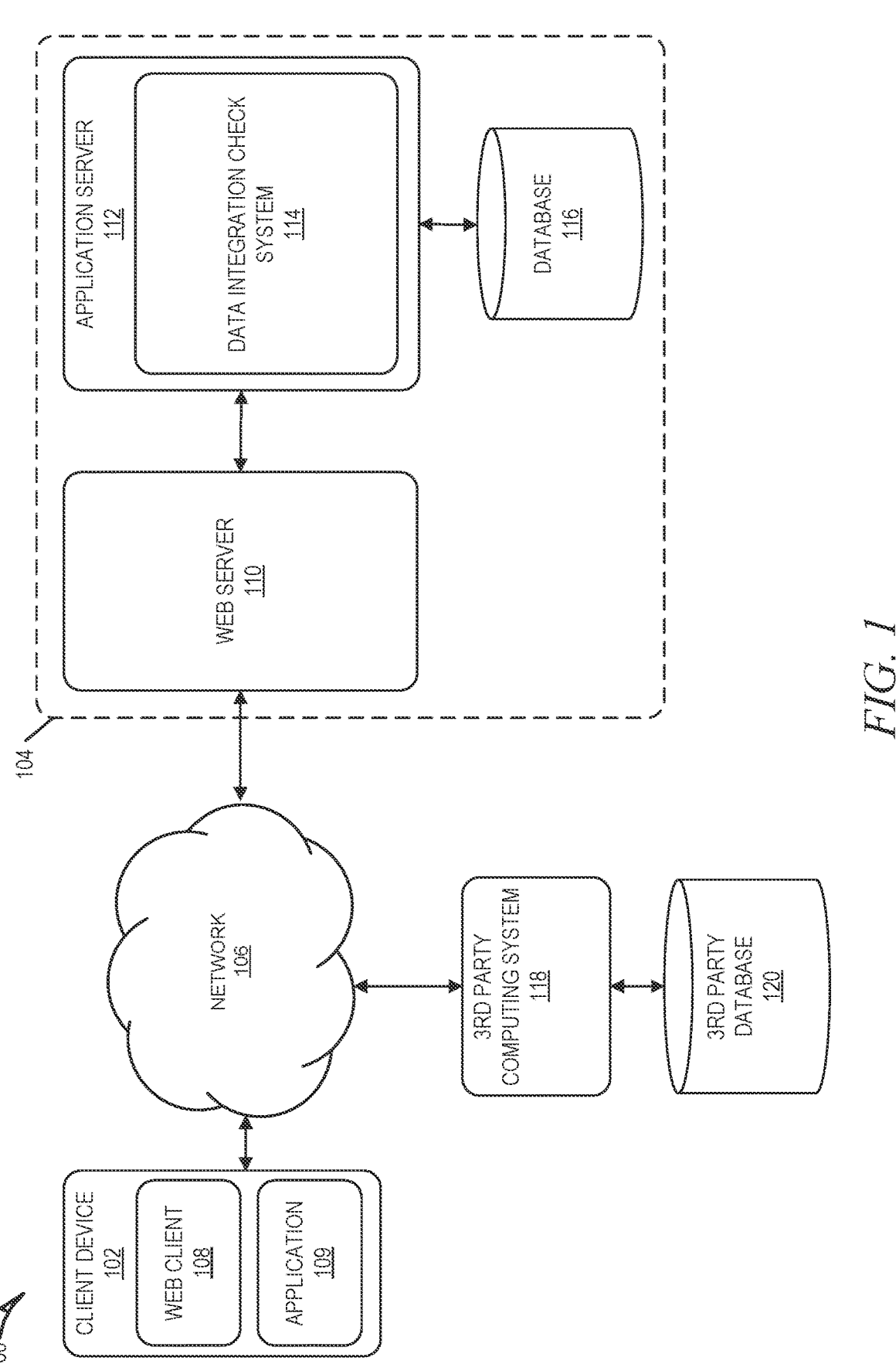
FIG. 1 is an architecture diagram depicting a data processing platform having a client-server architecture configured for exchanging data, according to an example embodiment.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure relate to performance of agnostic data integrity checks on source data, and generation of human-readable report based thereon which may be useable to identify specific errors or anomalies within the source data. Example embodiments involve systems and methods for performing the data integrity checks and generating the human-readable reports. For example, the method may include operations to ingest data from a source database through a data pipeline and into a local database, access the data from the data pipeline, determine a data type of the data, determine subtypes of data elements that make up the data, determine a count of each subtype, and generate a human-readable report, to be displayed at a client device. The human-readable report includes information and statistics useable to enable a user to quickly view the report and make determinations about the quality of the source data, and more easily locate errors or anomalies. The data ingested may include data retrieved through tabular inputs (e.g., tabular input data), such as data collected in an HTML table.

In some embodiments, the data integrity check system determines the data type of the source data based on a set of Boolean checks. Boolean checks include queries for identifying properties of data based on Boolean algebra. Boolean checks therefore have two possible values (e.g., yes or no). The data integrity check system may include a set of one or more Boolean checks applicable to any type of data that may be ingested. The Boolean checks may also have sets of associated Boolean sub-checks, in order to identify data subtypes within the source data. The data integrity check system is also configured to receive additional Boolean checks and Boolean sub-checks from a client device. By applying the Boolean checks, the data integrity system can determine a data type of the source data, as well as the sub-types which define data elements within the source data.

In example embodiments, the data integrity check system accesses historical data based on various properties of the source data, such as the source database from which the source data is retrieved, units of measurement associated with the source data, subtypes included in the source data, or one or more user inputs characterizing the source data. The data integrity check system may then perform checks on the historical data in order to determine a data type of the historical data, a subtype of each historical data element within the historical data, and a count of the subtypes of historical data, in order to generate a human-readable report based on the historical data. The report of the historical data provides additional criteria useable to determine if recently ingested source data contains anomalies or errors.

In example embodiments, the data integrity check system performs a comparison between the human-readable report of recently ingested source data and the report of the historical data in order to identify and locate differences and disparities. For example, by comparing the reports, the data integrity check system may determine that a particular data element within the source data is of a suspicious order or magnitude compared to what may be historically expected, or a value may be indicated to be negative when historically only positive values have been seen. The data integrity check system may visually distinguish the suspicious values located within the source data based on the report of the historical data, for example by highlighting suspicious and incorrect values in a pre-defined color, or by any other means of visually distinguishing a value.

In some instances, the data integrity system receives a set of expected data types, subtypes, and counts associated with a particular set of source data. Similar to the method discussed above with respect to the historical data, the expected values may be useable to detect errors, anomalies, and suspicious values which might exist in the source data.

The report generated by the data integrity system includes additional useful information for validating the source data, such as numerical values, units of measurement referenced in the source data, and statistics and properties of the source data (e.g., 90% are numbers, 2% are negative, etc.). For example, a user may also provide one or more threshold values to be applied to the report generated by the data integrity system, such that when a value of a data element within the source data transgresses the threshold, the data integrity system provides an indication of the transgression.

FIG. 1 is an architecture diagram depicting a network system 100 having a client-server architecture configured for exchanging data, according to an example embodiment. While the network system 100 shown in FIG. 1 employs a client-server architecture, the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

As shown, the network system 100 includes a client device 102 in communication with a data processing platform 104 over a network 106. The data processing platform 104 communicates and exchanges data with the client device 102 that pertains to various functions and aspects associated with the network system 100 and its users. Likewise, the client device 102, which may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the network system 100 to exchange data with the data processing platform 104 over the network 106.

The client device 102 communicates with the network 106 via a wired or wireless connection. For example, one or more portions of the network 106 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a World-wide Interoperability for Microwave Access (WiMax) network, another type of network, or any suitable combination thereof.

In various embodiments, the data exchanged between the client device 102 and the data processing platform 104 may involve user-selected functions available through one or more user interfaces (UIs). The UIs may be specifically associated with a web client 108 (e.g., a browser) or an application 109, executing on the client device 102, and in communication with the data processing platform 104.

Turning specifically to the data processing platform 104, a web server 110 is coupled to (e.g., via wired or wireless interfaces), and provides web interfaces to, an application server 112. The application server 112 hosts one or more applications (e.g., web applications) that allow users to use various functions and services of the data processing platform 104. For example, the application server 112 may host a data integrity check system 114 that provides a number of data checks and analyses on source data to generate a human-readable report. In some embodiments, the data integrity check system 114 runs and executes on the application server 112, while in other embodiments, the application server 112 provides the client device 102 with a set of instructions (e.g., computer-readable code) that causes the web client 108 of the client device 102 to execute and run the data integrity check system 114. Further, the data integrity check system 114 retrieves associated historical data, or may receive expected value data, in order to identify specific data elements which may be suspicious or potentially in error.

The source data accessed and analyzed by the data integrity check system 114 may, for example, include tabular input data. Tabular input data may, for example, include data which represents a table with a given set of columns with corresponding values. In some embodiments, the data integrity check system 114 may also access and analyze non-tabular input data, where non-tabular input data may, for example, include rows of values, where each row represents a distinct variable. The human-readable report includes rows and columns of information relevant to the verification of the tabular input data, such as a textual representation of the data type, a textual representation of the data subtype, a count of the data subtype (e.g., as a numerical quantity), and other statistics relevant to determining the quality of the source data, such as a percentage of non-zero numbers and a percentage of unavailable data entries. In some embodiments, a user may select specific statistics that they wish to be displayed from among a set of possible source data statistics (e.g., through a graphical user interface).

For example, the tabular input data may include a column of values collected through a tabular input form, including a list of temperature values, a list of names, or even something as generic as a list of uncharacterized values. The data integrity check system 114 receives the ingested data and determines characteristics for each data element within the data (e.g., the data type, and data subtype) in order to generate a human-readable report.

The tabular input data analyzed by the data integrity check system 114 is obtained from a third-party computing system 118 (e.g., corresponding to a data source), and in particular, a third-party database 120 communicatively coupled to the third-party computing system 118. The data may be routinely automatically retrieved (e.g., nightly) by the data integrity check system 114, or manually provided by a user of the third-party computing system 118 or the client device 102 for subsequent processing and analysis by the data integrity check system 114.

The data obtained from the third-party computing system 118 is stored in a database 116 that is communicatively coupled to the application server 112 (e.g., via wired or wireless interfaces). The data processing platform 104 may further include a database server (not shown) that facilitates access to the database 116. The database 116 may include multiple databases that may be internal or external to the data processing platform 104.

FIG. 2 is a block diagram illustrating various modules comprising the data integrity check system 114, which is provided as part of the data processing platform 104, consistent with some embodiments. As is understood by skilled artisans in the relevant computer and Internet-related arts, the modules illustrated in FIG. 2 represent a set of executable software instructions and the corresponding hardware (e.g., memory and processor) for executing the instructions. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the data integrity check system 114 to facilitate additional functionality that is not specifically described herein. Furthermore, the various functional modules and engines depicted in FIG. 2 may reside on a single computer (e.g., a server or a client device), or may be distributed across several computers in various arrangements such as cloud-based architectures.

The data integrity check system 114 is shown as including a data retrieval module 202, a data identification module 204, a computation module 206, a report module 208, and a presentation module 210, all configured to communicate with each other (e.g., via a bus, shared memory, a switch, or application programming interfaces (APIs)). The aforementioned modules of the data integrity check system 114 may, furthermore, access one or more databases that are part of the data processing platform 104 (e.g., database 116), and each of the modules may access one or more computer-readable storage media of the client device 102.

The interface module 200 receives requests from various client computing devices, and communicates appropriate responses to the requesting client devices. The interface module 200 may receive requests from client devices in the form of Hypertext Transfer Protocol (HTTP) requests or other web-based application programming interface (API) requests. For example, the interface module 200 provides a number of interfaces (e.g., APIs or user interfaces that are presented by the client device 102) that allow data to be received by the data integrity check system 114.

The interface module 200 also provides user interfaces that include graphical representations of the various analytics produced by the data integrity check system 114. These user interfaces may include various user input fields configured to define a selection of items to be included in the human-readable report, to receive threshold values useable to identify anomalies within the source data, and to display reports generated by the data integrity check system 114.

The data retrieval module 202 is configured to retrieve data for processing and analysis. For example, the data retrieval module 202 accesses a data pipeline that routes data from a third-party source into a local database, in order to retrieve raw source data. In some embodiments, the data retrieval module 202 obtains such data from the third-party database 120 of the third-party computing system 118 through appropriate requests (e.g., API requests or calls) transmitted over the network 106. The data may be retrieved by the data retrieval module 202 in real time, as the raw source data is being ingested into a local database (e.g., database 116). In some embodiments, the data retrieval module 202 obtains data from a location specified by a user (e.g., via a user interface provided by the interface module 200) which may be within a local database (e.g., database 116).

The data identification module 204 is configured to analyze the raw source data accessed by the data retrieval module 202 in order to identify a data type and corresponding data subtypes of the data elements within the source data. For example, the data identification module 204 applies one or more sets of data checks on the source data (e.g., Boolean checks) in order to identify data type and data subtypes, and to identify possible anomalies within the data. An example set of data checks which may be applied to a particular set of source data (for example, tabular input data) is provided below:

```
1. Is this a number?
    If yes, then:
        Is this an integer?
        Is this a zero?
        Is this a negative value?
This may be expressed in pseudo-code as:
    isintenger (x)
    x == '0'
    int(x) < 0
2. Is this a date/time
    If yes, then:
        Is the date in the future?
        Is the date before 1980?
        Is a time zone specified?
        Is the time specified to be in UTC?
        Is the time component always 00:00:00
This may be expressed in pseudo-code as:
    x > date.now( )
    x < date(1980, 1, 1)
    x.contains('+') or x.contains('-')
    x.endsWith('Z') // Z indicates UTC
    x.hours( ) == 0 and x.minutes( ) == 0 and x.seconds( ) == 0
3. Is this not a number? (e.g., indicates a general string)
    If yes, then:
        Is the string empty?
        Is the string all uppercase?
        Is the string all lowercase?
        Does the string start with a capital letter?
        Is every word in the string capitalized?
        Is there whitespace at the beginning or at the end
        of the string?
        Are there any newline characters in the string?
This may be expressed in pseudo-code as:
```

-continued

```
x == ''
x == x.toUpperCase( )
x == x.toLowerCase( )
x[0] == x[0].toUpperCase( )
x == x.capitalize( )
x != x.trim( )
x.contains('\n')
```

By applying a set of data checks (e.g., the Boolean checks above), the data identification module 204 identifies a data type corresponding to the source data, data subtypes of data elements within the source data, and possible suspicious data elements or anomalies within the source data. In some embodiments, the data identification module 204 selects an appropriate set of checks based on a received user input defining the appropriate checks to apply, or by detecting characteristics within the source data. For example, the data identification module 204 may have distinct sets of data checks which may be applied to different data sources, or simply based on user selection.

In some instances, the data identification module 204 receives data check definitions from a client device (e.g., client device 102). For example, a user may provide a set of characteristics (e.g., units of measurement, data format) and expected values (e.g., an expected order of magnitude, an expected range of values), and assign the set of characteristics and the expected values to a particular data source, or set of source data.

The computation module 206 is configured to receive and analyze source data. The analysis by the computation module 206 includes determining a count of data types and data subtypes, and calculating statistics of the source data, such as average and median values. In some embodiments, a user may identify a desired set of calculations and statistics to be applied to the source data.

The report module 208 is configured to receive the data type and data subtype classifications determined by the data identification module 204 and the calculations done by the computation module 206 in order to generate a human-readable report. The human-readable report includes a presentation of the identified data types, data subtypes, and corresponding counts. In some instances, the report module 208 is may visually distinguish suspicious values and possible errors, based on determinations made by the data identification module 204 and the computation module 206. For example, the report module 208 may visually distinguish suspicious values by placing a graphical element at or near the suspicious or potentially erroneous value, or by highlighting the suspicious or potentially erroneous value in a predefined color.

The presentation module 210 is configured to cause presentation of the report (e.g., generated by the report module 208) on a display coupled to or embedded in a client device. In some embodiments, the presentation module 210 also causes presentation of a graphical user interface that includes user input fields to receive characteristics and expected value definitions for use by the data identification module 204 and the computation module 206.

Figure 3:
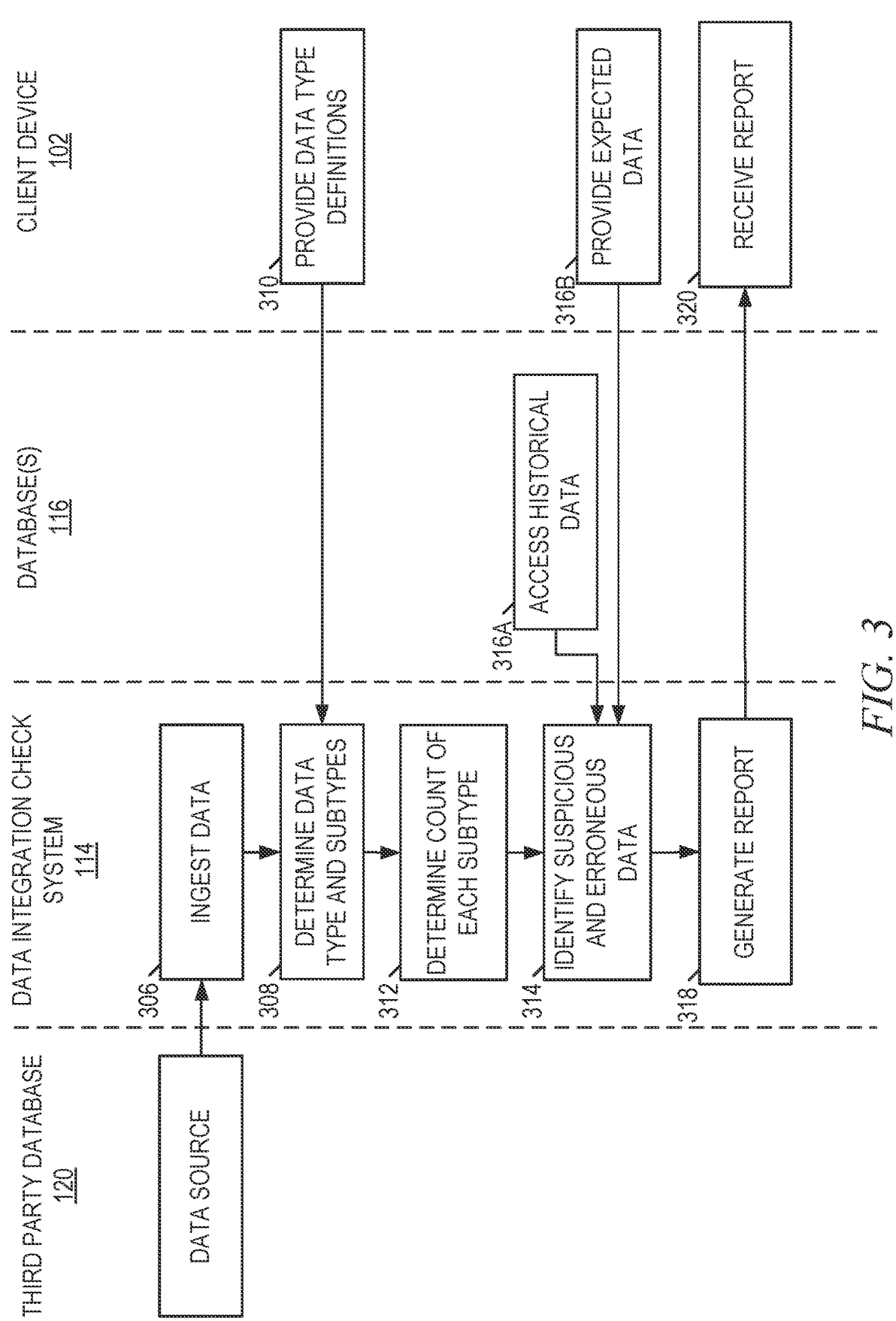
FIG. 3 is an interaction diagram illustrating various example interactions between the data integrity check system, a third-party computing system, databases, and a client device, consistent with some embodiments.

FIG. 3 is an interaction diagram illustrating various example interactions between the data integrity check system 114, third-party database 120, databases 116, and client device 102, consistent with some embodiments.

At operation 306, the data retrieval module 202 of the data integrity check system 114 ingests source data from a data source (e.g., the third-party database 120). For purposes of explanation, FIG. 3 depicts the data integrity check system 114 retrieving source data from the third-party database 120; however the data retrieval module 202 may also access any other data source specified by a user.

At operation 308, the data identification module 204 of the data integrity check system 114 determines one or more data types of the ingested source data based on a set of data checks. In some embodiments, at operation 310, the data identification module 204 receives data checks (such as data type definitions) from multiple sources, including the databases 116 and the client device 102. The data checks include sets of one or more queries to determine characteristics of the source data. The data checks may, for example, include a set of Boolean checks. After identifying a data type of the source data, the data identification module 204 determines data subtypes of the elements comprising the source data.

At operation 312, the computation module 206 of the data integrity check system 114 calculates a count of each data subtype within the source data, as well as relevant statistics of the source data, in order to generate a report (e.g., through a graphical user interface with user input fields, generated by the presentation module 210). In some embodiments, a user of the client device 102 may specify statistics and counts for the computation module 206 to determine.

At operation 314, the computation module 206 identifies suspicious and erroneous data within the source data based on the counts and the data type definitions received from the client device 102. In some embodiments, as shown in operations 316A and 316B, the computation module 206 may also access historical data from the databases 116 and expected value data from the client device 102 in order to identify suspicious elements within the source data (e.g., suspicious counts, subtypes, and data types). For example, the computation module 206 may compare the data types, data subtypes, and counts of the source data with historical data types, historical data subtypes, and historical counts of similar historical data (e.g., based on a source, or characteristics of the source data) in order to determine if the calculated values are within a reasonable range.

In some embodiments, the user may specify expected values, or a threshold range of expected values, as expected value data. The computation module 206 may then identify the suspicious and erroneous values based on factors including the historical source data, as well as the expected value data.

At operation 318, the report module 208 generates a report including the determined data type, data subtypes, and counts, as well as indications of erroneous or suspicious data. The indications of erroneous or suspicious data may be included in a notification transmitted to the client device 102. The notification may indicate that elements within the source data are or may be in error, and the suspicious or erroneous data may be visibly distinguished from the remainder of the source data in the report. At operation 320, the client device 102 receives and presents the report.

Figure 4:
FIG. 4 is a flowchart illustrating a method for generating a human-readable report based on an analysis of source data, according to some embodiments.
Figure 4:
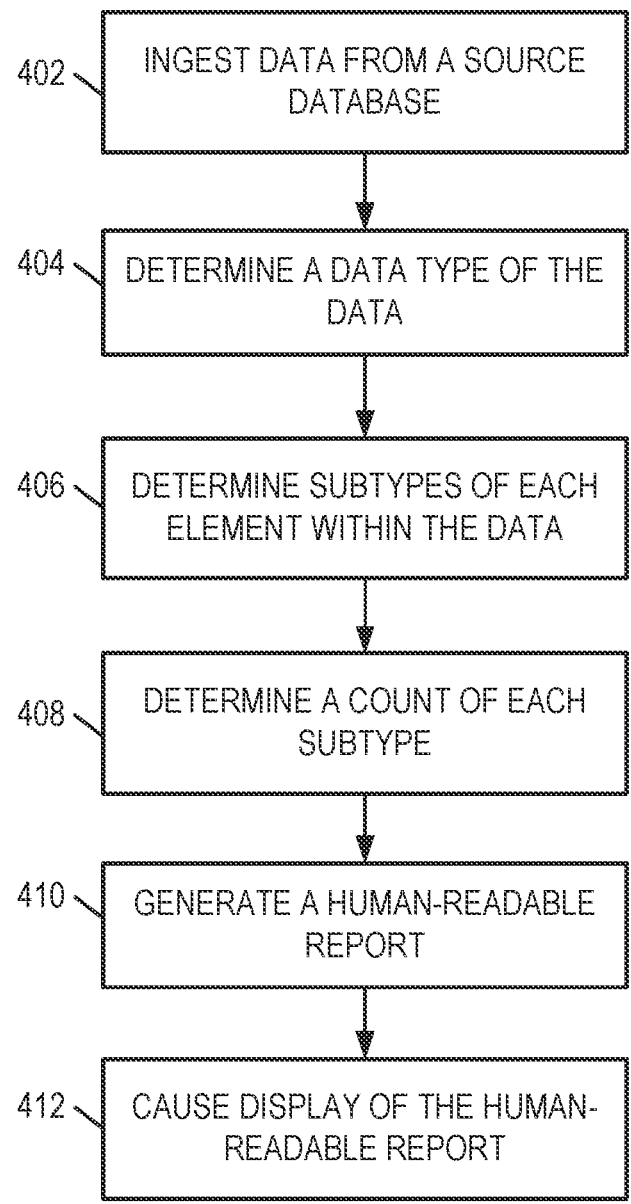

FIG. 4 is a flowchart illustrating a method 400 for generating a human-readable report based on an analysis of source data (e.g., as briefly discussed in FIG. 3), according to some embodiments. At operation 402, the data retrieval module 202 receives source data from a source database (e.g., third-party database 120). In some embodiments, a user may identify the source database through a graphical user interface displayed at the client device (e.g., client device 102).

At operation 404, the data identification module 204 identifies one or more data types of the source data, based on one or more data checks. Data types include numbers, dates, times, and text strings. A user may also identify and provide definitions for additional data types. The data checks applied by the data identification module 204 include Boolean checks.

At operation 406, the data identification module 204 identifies one or more data subtypes of data elements comprising the source data. The data subtypes may vary between data types. For example, for numerical data, data subtypes may include integers, negative values, zeros, and so on, while for dates, the data subtypes may include future dates, dates before a specified time, month data, day data, etc.

At operation 408, the computation module 206 calculates a count of each subtype within the source data. The count may simply be a number of each subtype. For example, the computation module 206 may calculate that a particular set of source data which corresponds to "dates in a particular month" has a total of thirty-one distinct values (e.g., thirty-one distinct dates within the source data). The computation module 206 determines a count corresponding to each subtype within the source data. At a glance, a user may determine whether or not the source data appears to be reasonable. For example, when presented with a report indicating counts of data subtypes corresponding to source data including dates, if a user notices that the count indicates only two distinct date values when at least thirty-one are expected, then the user may determine that the data is in error.

In some embodiments, the computation module 206 accesses historical data related to the source data (e.g., of the same data source, or of the same data type) in order to compare the historical data to the counts of the source data. By comparing the historical data with the counts of the source data, the computation module 206 identifies disparities between the sets of data. For example, the computation module 206 may determine that a particular data element within the source data is shown as a negative value, while historically the value has been positive, or that a particular value is of a different format or order of magnitude from the historical values.

In some embodiments, the computation module 206 calculates statistics based on the source data. The statistics include, for example, average and median values of the subtypes and frequency of each subtype among the total number of subtypes.

In some embodiments, a user may specify a threshold value, or threshold range of values, for each data subtype among the possible data subtypes comprising the source data. Upon receiving the threshold values, or threshold range of values, the computation module 206 may flag any calculated statistics and counts which transgress the defined thresholds.

Having calculated the counts of subtypes and compared the counts of the subtypes with historical data, or the defined thresholds, the computation module 206 may flag, highlight, or otherwise visually distinguish the suspicious and erroneous values.

At operation 410, the report module 208 generates a human-readable report including at least the determined data types, the determined data subtypes, counts of the data subtypes, and statistics related to the source data. In some embodiments, the report also includes indications of suspicious or erroneous data. At operation 412, the presentation module 210 provides a data file including the report to a client device (e.g., client device 102).

Figure 5:
FIG. 5 is a flowchart illustrating a method for generating a second human-readable report based on an analysis of historical data, according to some embodiments.
Figure 5:
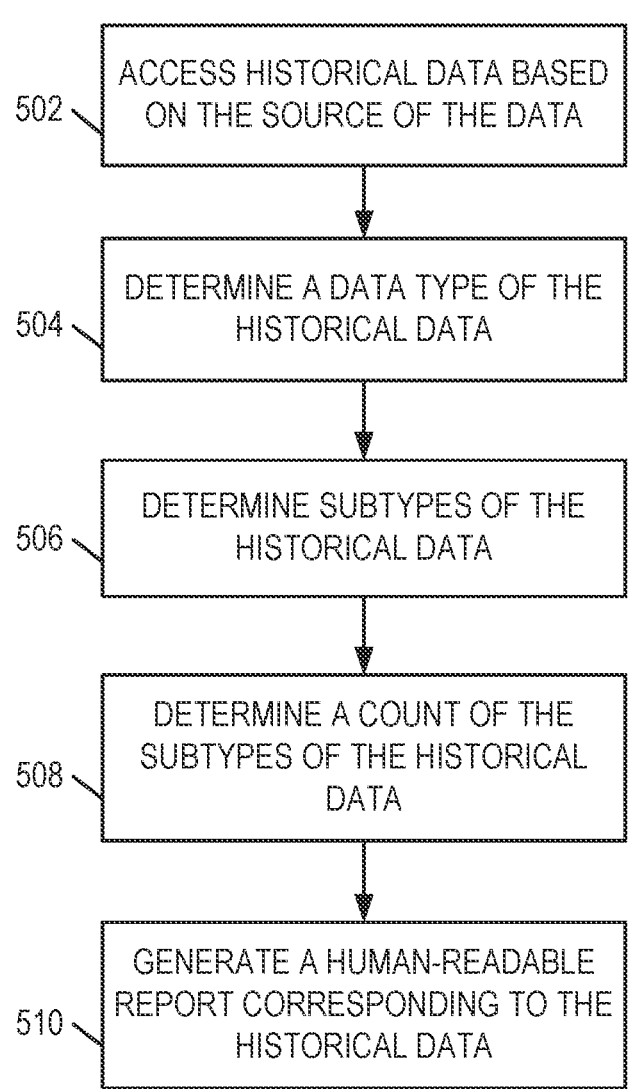

FIG. 5 is a flowchart illustrating a method 500 for generating a second human-readable report based on an analysis of historical data to compare with the source data, according to some embodiments.

At operation 502, the data retrieval module 202 accesses historical data (e.g., from third-party database 120 or database 116) based on one or more characteristics of the source data including, for example, the source database or the data type. The historical data therefore provides an indication of expected values and expected data subtypes within the source data.

At operation 504, the data identification module 204 applies one or more data checks to the historical data (e.g., Boolean checks) in order to determine a data type of the historical data. In some instances, the data type may be known prior to applying the Boolean checks (e.g., based on a user input).

At operation 506, having identified the data type of the historical data, the data identification module 204 identifies one or more data subtypes comprising the historical data by applying additional Boolean checks corresponding to the data type. At operation 508, the computation module 206 calculates a count of each data subtype. The computation module 206 may also calculate relevant statistics for the historical data.

At operation 510, the report module 208 generates a human-readable report including the data types, data subtypes, counts of the data subtypes, and relevant statistics. In instances in which the report module 208 receives user inputs specifying statistics and information to include the specific statics and information requested by the user. The human-readable report includes the data type, a listing of the data subtypes with corresponding counts, and the relevant statistics.

Figure 6:
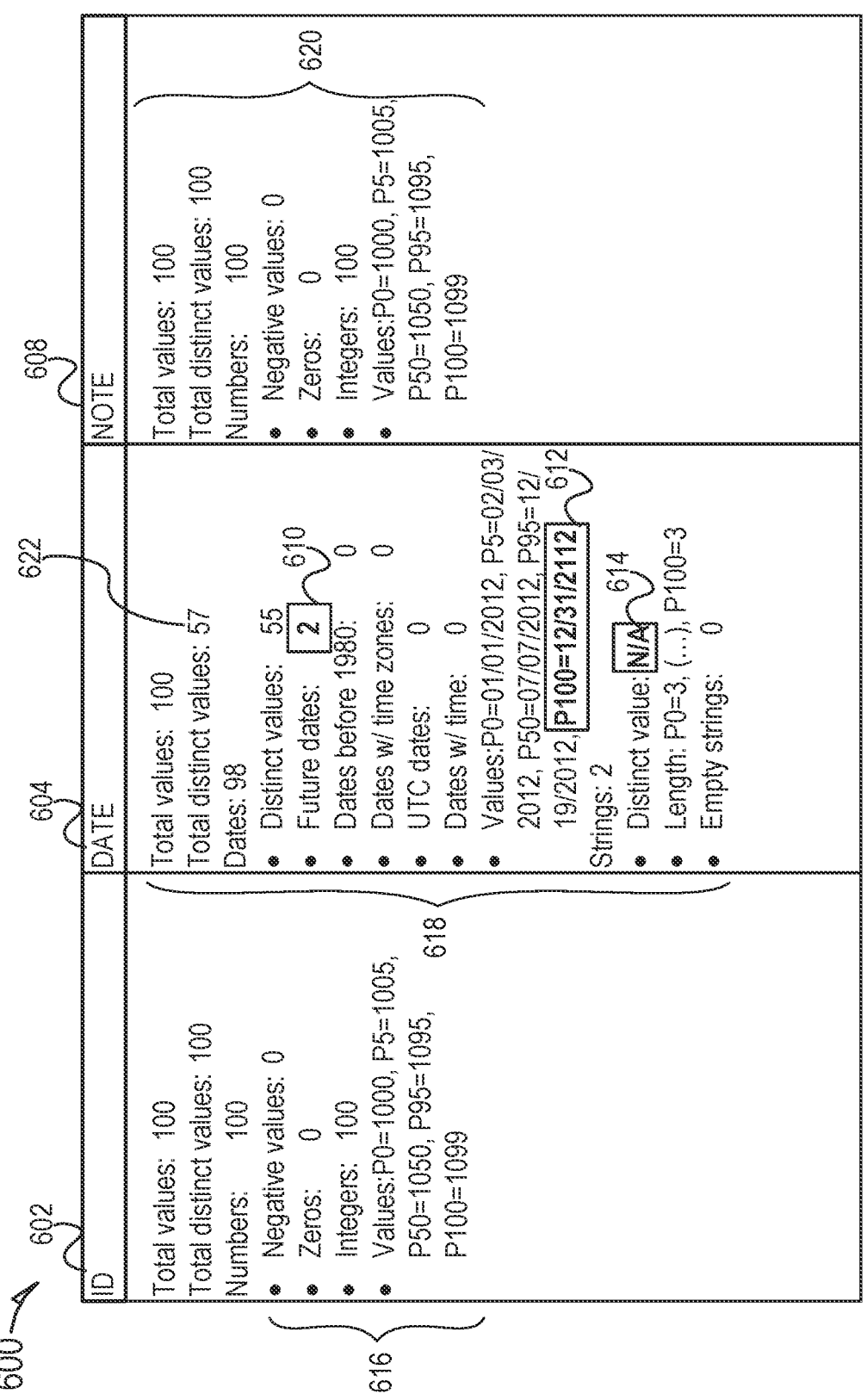
FIG. 6 is a diagram illustrating a report generated by the data integrity check system, according to some embodiments.

FIG. 6 is an illustration of a human-readable report 600 generated by the report module 208 of the data integrity check system 114, according to some embodiments. The human-readable report 600 is shown to include an indication of data types of source data (e.g., data type 602, data type 604, and data type 608), listings of data subtypes (e.g., data subtype 616, data subtype 618, and data subtype 620), and indications of suspicious or erroneous values (e.g., indicator 610, indicator 612, indicator 614).

The data types (e.g., data type 602, data type 604, and data type 608) are indicated by human-readable text, displayed as headings for each set of source data within the report 600. For example, data type 602 indicates a data type corresponding to data subtypes 616, data type 604 corresponds to data subtypes 618, and data type 608 corresponds to data subtypes 620.

The data subtypes (e.g., data subtypes 616, data subtype 618, and data subtype 620) are indicated by human-readable text. In some embodiments, the data subtypes are displayed in a column format, in a location within the report 600 related to the corresponding indication of data type (e.g., data type 602, data type 604, and data type 608). Data subtypes may vary based on the data type. For example, the set of source data corresponding to data type 604 and data subtypes 618 may include tabular input data corresponding to one or more dates and times. Thus, data subtypes 618 may include data subtypes such as future dates, dates before 1980, and dates with time zones.

The data subtype counts are also shown to include a count 622 indicating a total quantity of the data subtype within the source data. For example, the data subtype indicated as "total distinct values," has a corresponding count 622, indicating a total of fifty-seven occurrences of distinct values.

The report 600 also includes indications of suspicious or erroneous values (e.g., indicator 610, indicator 612, indicator 614). For example, indicator 610 is depicted as a box over a suspicious or erroneous value. The determination that a value of a data subtype is erroneous or suspicious may be based on comparison of the data subtype value with historical or expected values, as is discussed with reference to FIG. 4.

Figure 7:
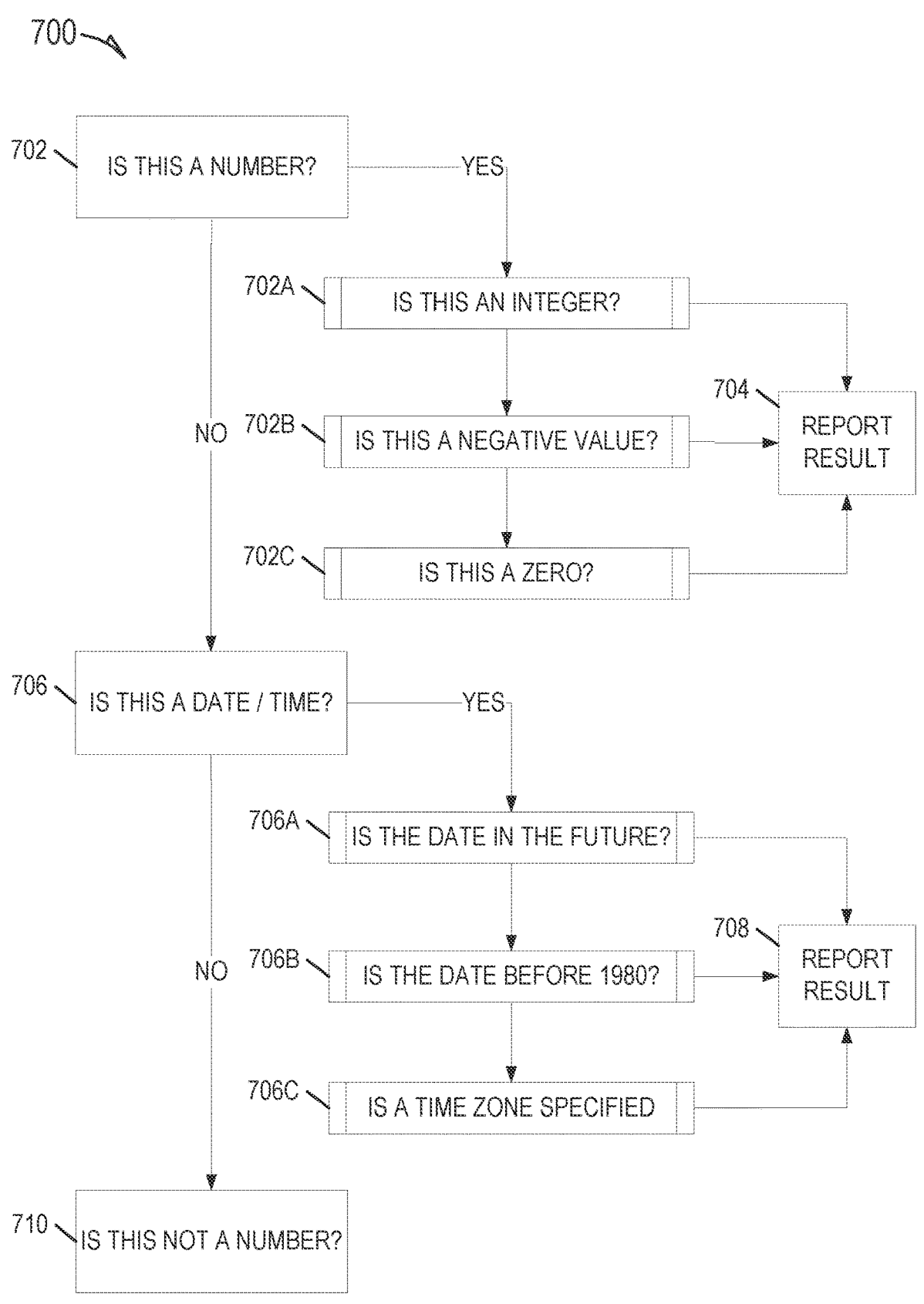
FIG. 7 is a flowchart illustrating a method of determining a data type of elements comprising the source data, according to example embodiments.

FIG. 7 is a flowchart illustrating a method of applying data checks 700 in order to determine a data type and data subtypes of data elements comprising source data, according to example embodiments. As shown in FIG. 7, the data checks 700 may include a set of Boolean checks. The Boolean checks may be preloaded into the data integrity check system 114, or in some embodiments may be received via the network 106 from a client device (e.g., client device 102). In some embodiments, a user may select specific Boolean checks from among a set of Boolean checks to apply to the source data. The Boolean checks may be applied in any order, and the order presented herein is solely for purposes of explanation.

Operations 702, 706, and 710 include Boolean checks for determining a data type of the source data. Starting at operation 702, the data identification module 204 applies a Boolean check to determine if the source data includes a number. If the Boolean checks returns "true," then the data identification module 204 may apply a corresponding set of sub-checks in operations 702A, 702B, and 702C in order to determine data subtypes of the source data. For example, If the Boolean check of operation 702 returns "true," then the corresponding sub-checks determine if the data indicates an integer (operation 702A), if the data indicates a negative value (operation 702B), or if the data indicates a zero (operation 702C). At operation 704, the data identification module 204 reports the results in order for the data integrity check system 114 to generate a human-readable report. If operation 702 returns a "false" value, then the data identification module 204 proceeds to operation 706, to apply a second Boolean check.

At operation 706, the data identification module 204 applies a second Boolean check to determine if the source data includes a date or time. If the Boolean check returns "true," then operations 706A, 706B, and 706C are applied, and the results are reported at operation 708. If the Boolean check returns "false," then the data identification module 204 continues to operation 710. In this way, the data identification module 204 may determine data types and data subtypes of source data.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 8:
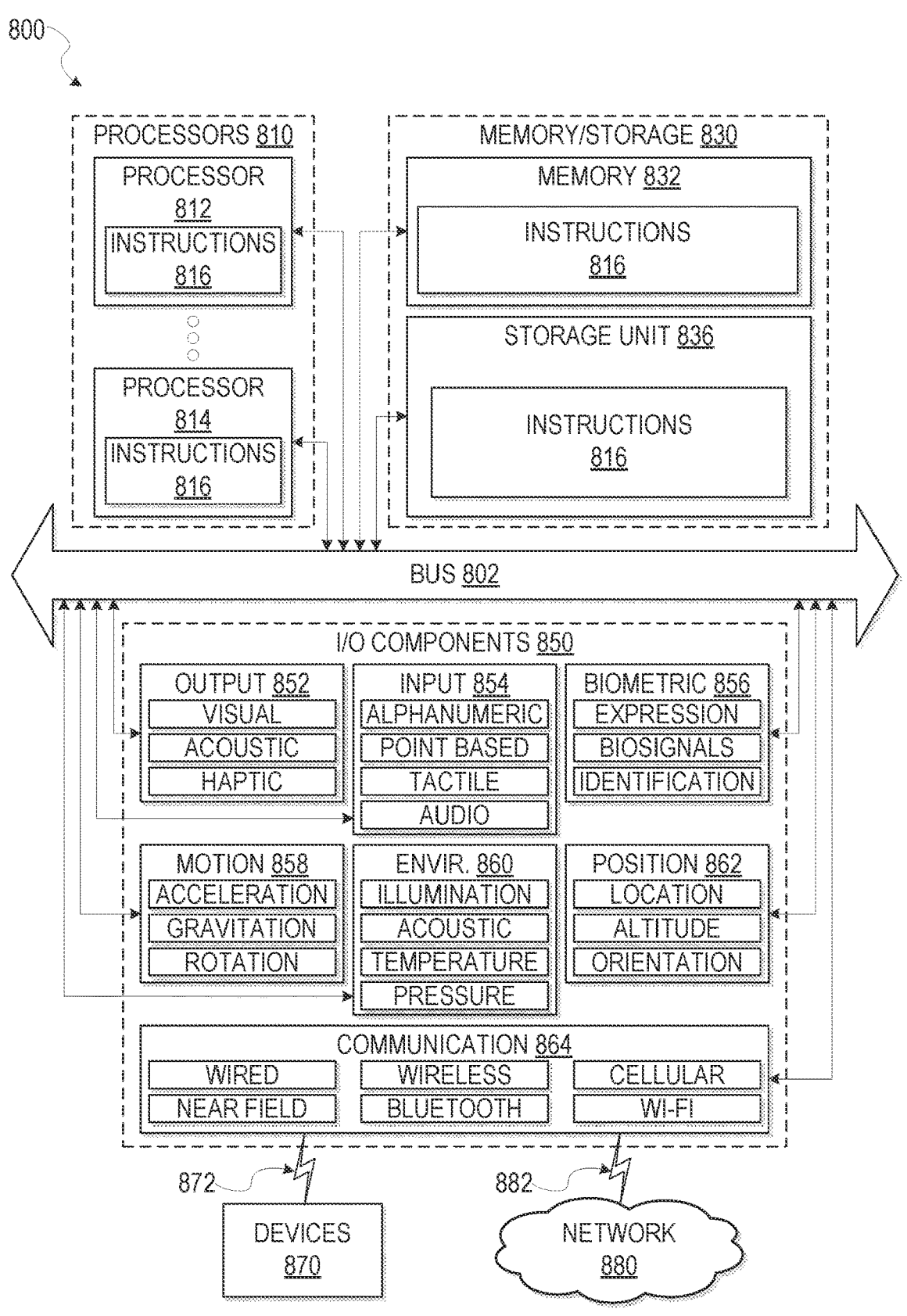
FIG. 8 is a diagrammatic representation of a machine in the example form of a computer system within which a set of instructions for causing the machine to perform any one or more of the methodologies discussed herein may be executed.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. Additionally, or alternatively, the machine 800 may correspond to any one of the client device 102, the web server 110, the application server 112, or the third-party computing system 118. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4117, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and using any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A method comprising:

applying, by one or more processors, one or more data checks to data to identify one or more data properties that characterize the data, a first data check of the one or more data checks including a set of queries to be applied in a predetermined order to identify the one or more data properties, a second data check of the one or more data checks including identifying a data type associated with the data by at least:

executing, by the one or more processors, the set of queries in the predetermined order to the data to identify the one or more data properties, the one or more data properties including at least one data property in a group consisting of a unit of measurement, a data range, and a data format;

detecting, by the one or more processors, an error associated with a data element in the data based on one or more criteria associated with the one or more data properties based on the one or more data checking results; and generating a notification including an indication of the error and the one or more data checking results, wherein at least a part of the method is performed by one or more processors.

2. The method of claim 1, wherein the causing display of the notification further comprises:

generating a report that includes a representation of at least the data element of the data.

3. The method of claim 1, further comprising selecting the one or more data checks to apply to the data based at least in part on a data source of the data.

4. The method of claim 3, wherein the selecting the one or more data checks further comprises selecting a first set of data checks based on a first data source, and selecting a second set of data checks based on a second data source, wherein the second set of data checks is different from the first set of data checks.

5. The method of claim 4, wherein the data includes a first data from the first data source and a second data from the second data source, wherein the applying one or more data checks to data further includes:

applying the first set of data checks to the first data to identify the one or more data properties of the first data; and applying the second set of data checks to the second data to identify the one or more data properties of the second data.

6. The method of claim 1, wherein the one or more criteria include a first set of expected values for the data element from a first data source and a second set of expected values for the data element from a second data source, wherein the first set of expected values is different from the second set of expected values.

7. The method of claim 6, wherein the first set of expected values includes a first threshold value for the data element from the data source, the second set of expected values includes a second threshold value for the data element from the second data source, and the first threshold value is different from the second threshold value.

8. The method of claim 1, wherein the one or more data properties of the data include at least one selected from a group consisting of:

a data source of the data;

and a data type of the data.

9. The method of claim 1, further comprising:

accessing historical data based on the one or more data properties of the data; and generating the one or more criteria based on the historical data.

10. A system comprising:

one or more memories having instructions stored thereon; and one or more processors configured to execute the instructions and perform operations comprising:

applying one or more data checks to data to identify one or more data properties that characterize the data, a first data check of the one or more data checks including a set of queries to be applied in a predetermined order to identify the one or more data properties, a second data check of the one or more data checks configured to identify a data type associated with the data by at least:

executing, by the one or more processors, the set of queries in the predetermined order to the data to identify the one or more data properties, the one or more data properties including at least one data property in a group consisting of a unit of measurement, a data range, and a data format;

detecting an error associated with a data element in the data based on one or more criteria associated with the one or more data properties based on the one or more data checking results; and generating a notification including an indication of the error and the one or more data checking results.

11. The system of claim 10, wherein the causing display of the notification further comprises:

generating a report that includes a representation of at least the data element of the data.

12. The system of claim 10, further comprising selecting the one or more data checks to apply to the data based at least in part on a data source of the data.

13. The system of claim 12, wherein the selecting the one or more data checks further comprises selecting a first set of data checks based on a first data source, and selecting a second set of data checks based on a second data source, wherein the second set of data checks is different from the first set of data checks.

14. The system of claim 13, wherein the data includes a first data from the first data source and a second data from the second data source, wherein the applying one or more data checks to data further includes:

applying the first set of data checks to the first data to identify the one or more data properties of the first data; and applying the second set of data checks to the second data to identify the one or more data properties of the second data.

15. The system of claim 10, wherein the one or more criteria include a first set of expected values for the data element from a first data source and a second set of expected values for the data element from a second data source, wherein the first set of expected values is different from the second set of expected values.

16. The system of claim 15, wherein the first set of expected values includes a first threshold value for the data element from the data source, the second set of expected values includes a second threshold value for the data element from the second data source, and the first threshold value is different from the second threshold value.

17. The system of claim 10, wherein the one or more data properties of the data include at least one selected from a group consisting of:

a data source of the data;

and a data type of the data.

18. The system of claim 10, wherein the operations further comprise:

accessing historical data based on the one or more data properties of the data; and generating the one or more criteria based on the historical data.

19. A non-transitory machine-readable storage medium comprising instructions that, when executed by one or more processors of a machine, cause the machine to perform operations comprising:

applying one or more data checks to the data to identify one or more data properties that characterize the data, a first data check of the one or more data checks including a set of queries to be applied in a predetermined order to identify the one or more data properties, a second data check of the one or more data checks configured to identify a data type associated with the data by at least:

executing, by the one or more processors, the set of queries in the predetermined order to the data to identify the one or more data properties, the one or more data properties including at least one data property in a group consisting of a unit of measurement, a data range, and a data format;

detecting an error associated with a data element in the data based on one or more criteria associated with the one or more data properties by at least conducting the set of queries in the predetermined order and the one or more data checks; and generating a notification including an indication of the error and the one or more data checking results.

20. The non-transitory machine-readable storage medium of claim 19, wherein the causing display of the notification further comprises:

generating a report that includes a representation of at least the data element of the data.

* * * * *